United States Patent
Yagisawa

(10) Patent No.: US 10,263,709 B2
(45) Date of Patent: Apr. 16, 2019

(54) TRANSIMPEDANCE AMPLIFIER, CIRCUIT MOUNTING STRUCTURE USING THE SAME AND OPTICAL TRANSCEIVER

(71) Applicant: FUJITSU COMPONENT LIMITED, Tokyo (JP)

(72) Inventor: Takatoshi Yagisawa, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 15/959,409

(22) Filed: Apr. 23, 2018

(65) Prior Publication Data

US 2018/0316441 A1  Nov. 1, 2018

(30) Foreign Application Priority Data

Apr. 28, 2017 (JP) ................................. 2017-090467

(51) Int. Cl.
*H04B 10/69* (2013.01)
*H04B 10/40* (2013.01)

(52) U.S. Cl.
CPC ......... *H04B 10/6911* (2013.01); *H04B 10/40* (2013.01); *H04B 10/693* (2013.01)

(58) Field of Classification Search
CPC .............................. H04B 10/69; H04B 10/697
See application file for complete search history.

(56) References Cited

U.S. PATENT DOCUMENTS

| 8,891,975 | B2 | 11/2014 | Yagisawa et al. |
| 9,444,552 | B2 | 9/2016 | Yagisawa |
| 2012/0170944 | A1* | 7/2012 | Yagisawa ........... H04B 10/6911 398/200 |
| 2015/0069220 | A1* | 3/2015 | Yagisawa ................. H03F 3/08 250/214 A |
| 2016/0245691 | A1* | 8/2016 | Suzuki ..................... H03F 3/08 |

FOREIGN PATENT DOCUMENTS

| JP | 2012-142822 | 7/2012 |
| JP | 2015-056704 | 3/2015 |

* cited by examiner

*Primary Examiner* — Shi K Li
(74) *Attorney, Agent, or Firm* — IPUSA, PLLC

(57) ABSTRACT

A transimpedance amplifier connectable to a light receiving element includes a bias terminal for suppling bias potential to the light receiving element, an input terminal to receive a signal from the light receiving element and a ground terminal. The bias terminal, the input terminal and the ground terminal are arranged on at one side of the transimpedance amplifier facing the light receiving element.

7 Claims, 9 Drawing Sheets

# TRANSIMPEDANCE AMPLIFIER, CIRCUIT MOUNTING STRUCTURE USING THE SAME AND OPTICAL TRANSCEIVER

CROSS-REFERENCE TO RELATED APPLICATION

The present application is based on and claims priority to Japanese Patent Application No. 2017-090467 filed on Apr. 28, 2017, the entire contents of which are hereby incorporated by reference.

BACKGROUND OF THE INVENTION

1. Field of the Invention

The disclosures herein relate to a transimpedance amplifier, a circuit mounting structure using the transimpedance amplifier and an optical transceiver.

2. Description of the Related Art

Along with an increase in computing power of computers, high-speed and multichannel interconnection between computers has been developed. For example, parallel optical transceiver modules are paralleled at a channel pitch of 250 μm. Moreover, signal speeds reach 25 Gpbs/ch, and further increasing signal speed is considered.

A photodiode (hereinafter referred to as "PD") array used in a parallel module includes a cathode and an anode arranged in each channel, and a transimpedance amplifier (hereinafter referred to as "TIA") array includes a bias terminal and an input terminal arranged in each channel. The cathode is connected to the bias terminal, and the anode is connected to the input terminal.

When connecting the PD to the TIA with a wire, a connection distance is shortened along with the increase in signal speed. However, when a flip chip bonding is used to connect the PD and the TIA, a connection distance is likely to increase to prevent interference in tools while mounting a chip and interference in underfill, which causes characteristic degradation and instability of bias voltage.

Japanese Patent Application Publication No. 2012-142822 discloses an optical receiver and an optical transmitter that are configured to stabilize a signal while implementing a 250 μm pitch by connecting grounded capacitors to cathodes of photodiodes and arranging the capacitors alternately on an upper surface and a back surface of a substrate.

Japanese Patent Application Publication No. 2015-56704 discloses an optical module configured to reduce cross talk between anode wiring arranged at a narrow pitch by electrically connecting each cathode to a backside pattern of a substrate so that cathode potential of each channel is common, and matching the anode wiring to TIA input impedance.

The input impedance of the TIA circuit is impedance relative to the ground potential, and the input impedance cannot be matched in the transmission line with respect to the cathode as disclosed in Japanese Patent Application Publication No. 2015-56704.

On the other hand, when the transmission line is configured with respect to the ground, the characteristic difference between the channels occurs unless the ground terminal is provided for each channel. The ground terminals are preferred to be provided for all of the channels, because the channel closer to the ground terminal is likely to have better channel characteristics.

However, when the ground terminal is provided for each channel in addition to a cathode terminal and an anode terminal, it might be difficult to mount the TIA to a substrate.

SUMMARY OF THE INVENTION

According to an embodiment, a transimpedance amplifier connectable to a light receiving element includes a bias terminal for suppling bias potential to the light receiving element, an input terminal to receive a signal from the light receiving element and a ground terminal. The bias terminal, the input terminal and the ground terminal are arranged on at one side of the transimpedance amplifier facing the light receiving element.

DESCRIPTION OF EMBODIMENTS

In the following, embodiments for implementing the invention will be described. The same members or the like are referred to by the same numerals, and a description thereof will be omitted.

[First Embodiment]

Figure 1:
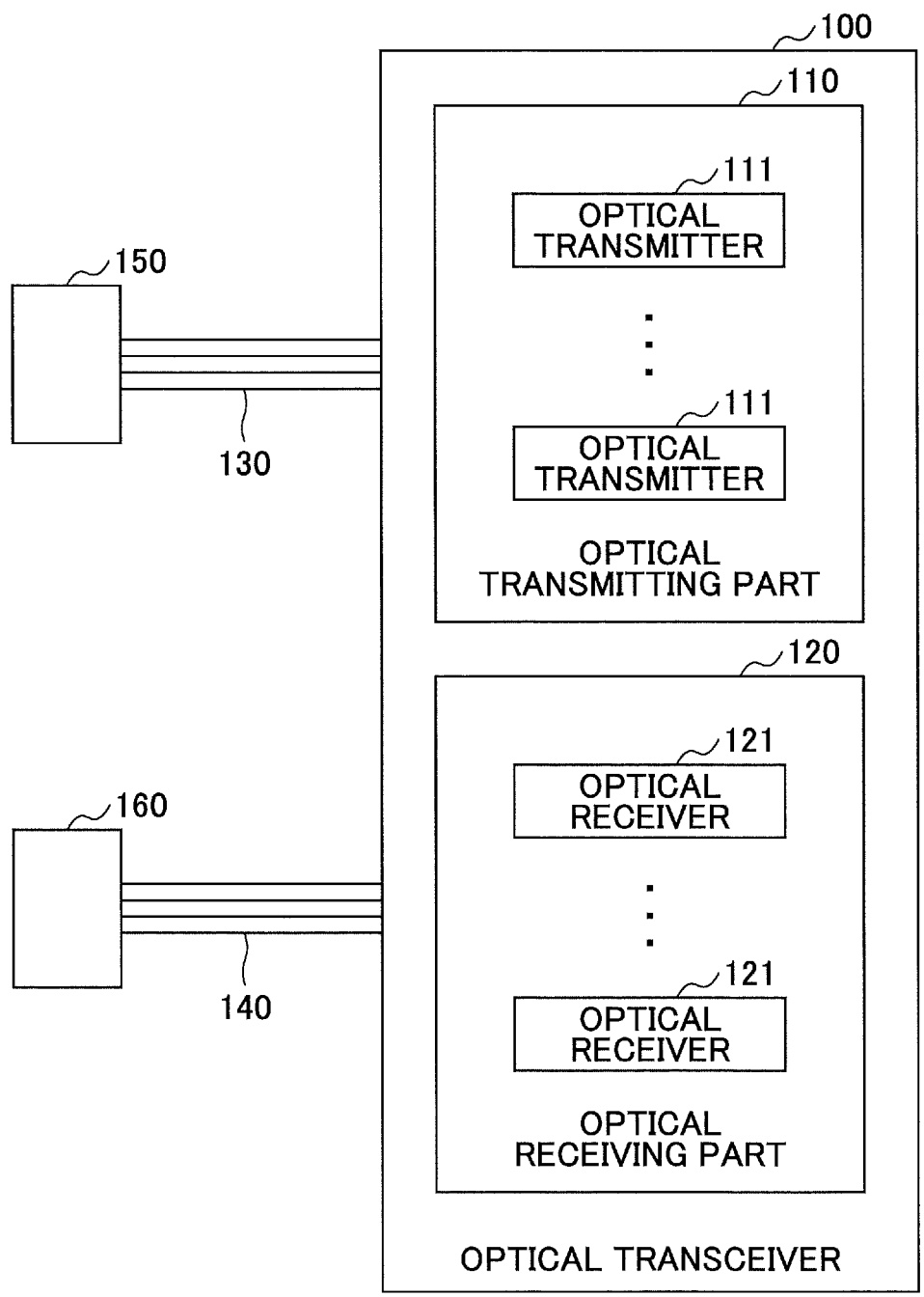
FIG. 1 is a diagram illustrating an optical transceiver according to a first embodiment of the present invention.

FIG. 1 is a diagram illustrating an optical transceiver according to a first embodiment of the present invention. As illustrated in FIG. 1, the optical transceiver 100 according to the embodiment includes an optical transmitting part 110 and an optical receiving part 120.

The optical transmitting part 110 includes optical transmitters 111. Each of the optical transmitters 111 includes a laser light source and a drive circuit, and generates an optical signal from a received data signal. A light waveguide 130 that includes optical waveguides corresponding to the optical transmitters 111 is optically connected to the optical transmitting part 110. An optical connector 150 is connected to the light waveguide 130. The light waveguide 130 guides optical signals generated by the optical transmitting part 110 to the optical connector 150. An optical fiber can be connected to the optical connector 150.

The optical receiving part 120 includes a optical receivers 121. Each of the optical receivers 121 includes a light receiving element that converts received light signal into an electric signal, and an amplifier that amplifies the electric signal. Otherwise, the optical receiver 121 may include a converter that converts a current signal from the light receiving element to a voltage signal. A light waveguide 140 that includes waveguides corresponding to the optical receivers 121 is optically connected to the optical receiving part 120. An optical connector 160 is connected to the light waveguide 140. The light waveguide 140 guides optical signals input through the optical connector 160. An optical fiber can be connected to the optical connector 160.

The light waveguide 130 and the light waveguide 140 are implemented by polymer waveguides, for example. The optical connectors 150 and 160 are implemented by an MT (Mechanical Transfer) connector or a PMT (Photomultiplier tube) connector, for example. The light waveguide 130 and the light waveguide 140 may be provided on a back surface of a substrate on which the amplifier and the light receiving element are mounted.

The optical transceiver 100 is mounted on a motherboard of a computer system, by connecting the optical transceiver 100 to a connector mounted on the motherboard. The optical transceiver 100 may be mounted approximately vertical to the motherboard, or may be mounted approximately horizontal to the motherboard. Moreover, the motherboard supplies electricity to the optical transceiver 100. The motherboard may supply the ground potential to the optical transceiver 100.

Figure 2:
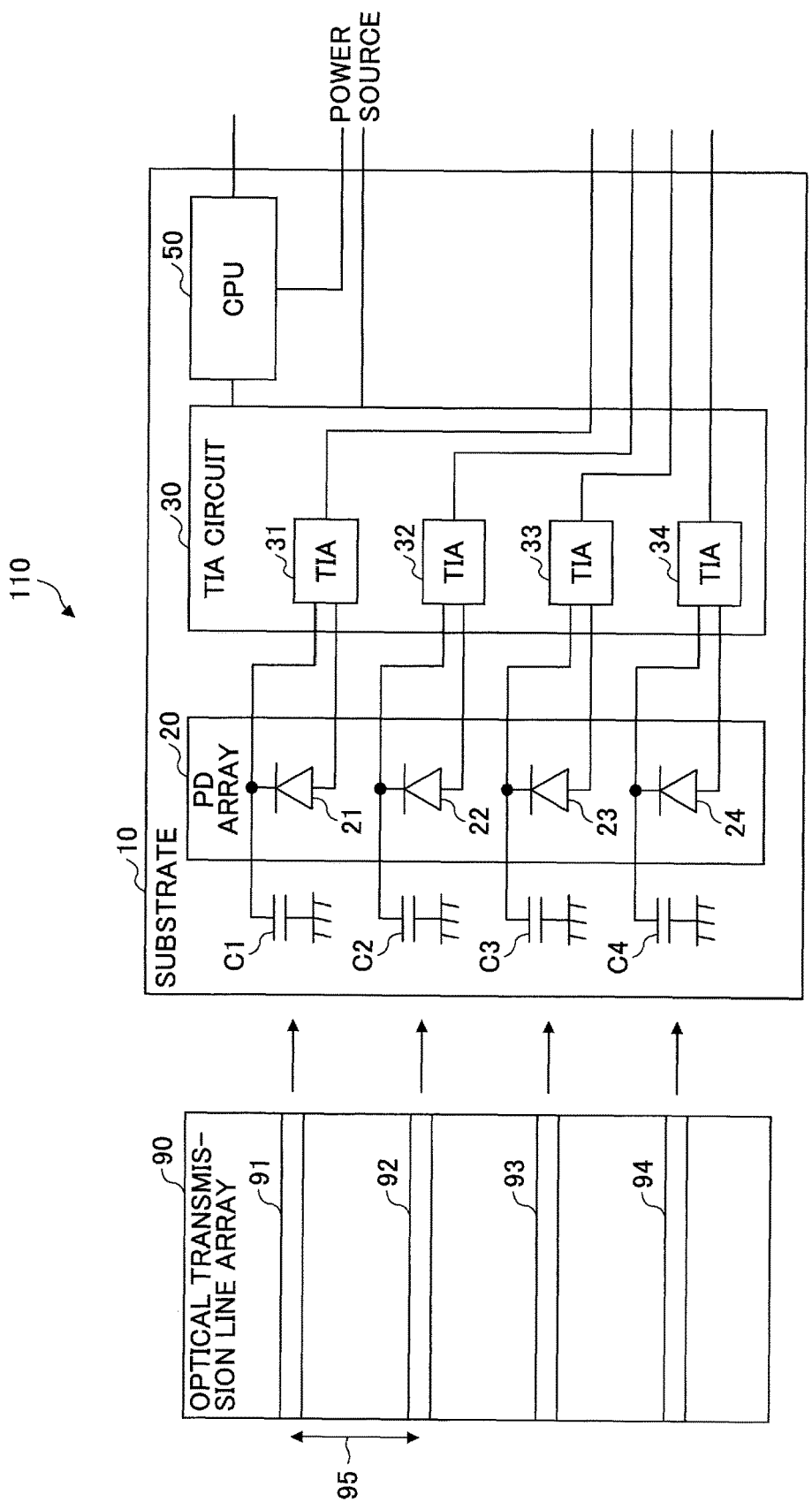
FIG. 2 is a diagram illustrating an optical receiving part according to the first embodiment.

FIG. 2 is a diagram illustrating the optical receiving part 120. The optical receiving part 120 is a device that receives light beam emitted from optical transmission lines 91 to 94 arranged in a transmission line array 90. Each of the optical transmission lines 91 to 94 are made of an optical fiber or an optical waveguide, for example. As illustrated in FIG. 2, the optical receiving part 120 includes a substrate 10, a PD array 20, a TIA array 30, capacitors C1 to C4, and a CPU (Central Processing Unit) 50. The transmission line array 90 is connected to the substrate 10. The substrate 10 may be a flexible printed circuit board (FPC). A pitch 95 indicates a pitch of the optical transmission lines 91 to 94 (e.g., 250 μm).

The PD array 20 in which PDs 21 to 24 are arrayed is mounted on the substrate 10. The PDs 21 to 24 receive light beams emitted from the optical transmission lines 91 to 94 and convert the received light beams to electric signals, respectively. Anodes and cathodes of the PDs 21 to 24 are connected to the TIA array 30.

The TIA array 30 that includes TIAs 31 to 34 converts the current signals received from the corresponding PD 21 to 24 into a voltage signal in accordance with control by the CPU 50. The TIAs 31 to 34 apply bias voltages to the cathodes of the PDs 21 to 24, respectively, using electricity supplied from an external power source.

The TIAs 31 to 34 may monitor light receiving conditions of the PDs 21 to 24 by monitoring current values of the bias voltages applied to the PDs 21 to 24, respectively. In addition, the TIAs 31 to 34 convert the current signals flowing to the anodes of the PDs 21 to 24 into voltage signals, respectively. Each of the TIAs 31 to 34 outputs the converted voltage signal to an electrical processing circuit provide in a later stage.

The TIA array 30 is formed as an IC (Integrated Circuit) chip, that is, a TIA IC.

Characteristic impedance of each of the lines connecting the anodes to the TIAs 31 to 34 may be matched to the input impedance of the TIAs 31 to 34, respectively. The characteristic impedance of the lines can be adjusted by changing size thereof. Thus, transmission characteristics of the signals between the PDs 21 to 24 and the TIAs 31 to 34 can be improved.

The capacitors C1 to C4 are connected to the cathodes of the PDs 21 to 24, respectively. The other ends of the capacitors C1 to C4 are grounded. Thus, the impedance on the cathode side of each of the PDs 21 to 24 can be decreased, thereby stabilizing the signals input into the TIAs 31 to 24 from the PDs 21 to 24.

The CPU 50 controls the TIA array 30 based on, for example, a control signal from the outside. The CPU 50 may obtain the light receiving conditions of the PDs 21 to 24 monitored by the TIAs 31 to 34 and may control the TIA array 30 based on the obtained light receiving conditions.

In the present embodiment, the TIAs 31 to 34 applies bias voltage to the corresponding PDs 21 to 24, respectively. However, for example, bias voltages may be applied to the PDs 21 to 24 separately from the TIAs 31 to 34.

Figure 3:
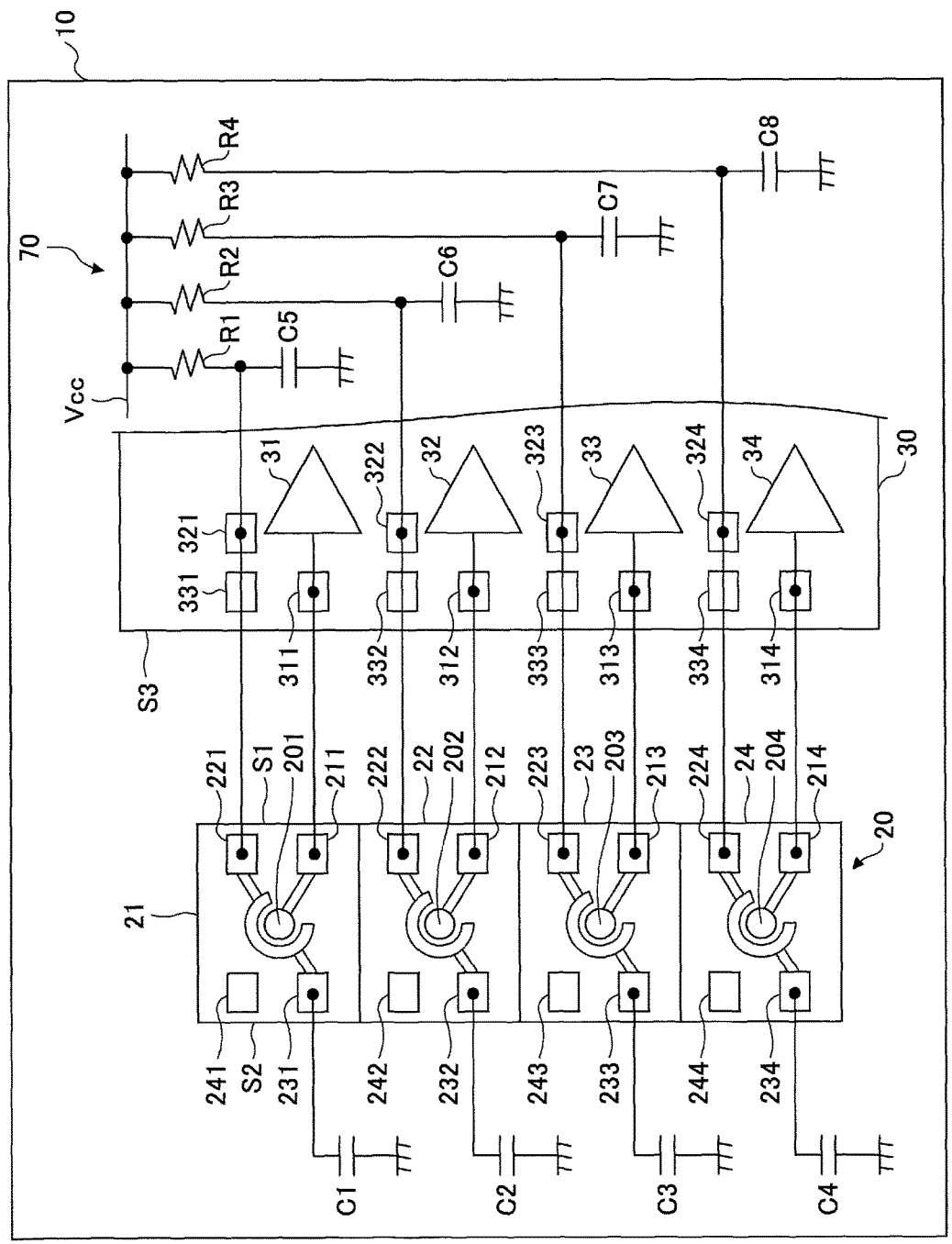
FIG. 3 is a diagram illustrating a TIA IC and an IC mounting structure according to the first embodiment.

FIG. 3 is a diagram illustrating a TIA IC and an IC mounting structure according to the first embodiment. As illustrated in FIG. 3, t the PD array 20 and the TIA array 30 are mounted on the substrate 10.

In the present embodiment, four PDs 21 to 24 are provided on the PD array 20, but a number of the PDs 21 to 24 corresponding to a number of channels of the optical transceiver 100 may be provided. A pitch between adjacent PDs 21 to 24 is, for example, 250 μm.

The PDs 21 to 24 include active areas 201 to 204, anodes connected to anode terminals 221 to 224, cathodes connected to pairs of cathode terminals 221 to 224 and 231 to 234, and terminals 241 to 244, respectively. The terminals 241 to 244 are terminals provided as dummies.

The active areas 201 to 204 are areas for receiving light, respectively. The anode terminals 211 to 214 are terminals that are connected to signal input terminals 311 to 314 of TIA array 30. Cathode terminals 221 to 224 are electrodes connected to bias terminals 321 to 324 of the TIA array 30.

The cathode terminals 231 to 234 arranged on the side of the capacitors C1 to C4 are terminals that are connected to the capacitors C1 to C4, respectively. The cathode terminals 231 to 234 are electrically connected to the cathode terminals 221 to 224, respectively.

The anode terminals 211 to 214 and the cathode terminals 221 to 224 are provided near a side S1 of the PD array 20. The cathode terminals 231 to 234 are provided near a side S2 opposite to the side Si. The cathode terminals 221 to 224 are connected with the bias terminals 321 to 324 on the side of the TIAs 31 to 34 along the side S1, respectively. The cathode terminals 231 to 234 are connected with the capacitors C1 to C4 along the side S2, respectively.

The TIA array 30 includes input terminals 311 to 314 for inputting signal, bias terminals 321 to 324 for supplying bias voltage, and ground terminals 331 to 334 for each of the TIAs 31 to 34, respectively. The input terminals 311 to 314 and the ground terminals 331 to 334 are alternately arranged along and parallel to a side S3 that faces the PD array 20. The bias terminals 321 to 324 are arranged inside of the TIA array 30 relative to the ground terminals 331 to 334, respectively. In other words, the bias terminals 321 to 324 are arranged farther from the side S3 than the ground terminals 331 to 334, respectively.

In the embodiment, the PD array 20 and the TIA array 30 can be connected to each other by both of wire bonding and flip chip bonding. However, terminals of the TIA array needed to connect with terminals of the PD array differ depending on whether the PD and the TIA are connected by flip chip bonding or by wire bonding.

When connecting the PD array 20 to the TIA array 30 by wire bonding, the input terminals 311 to 314 and the bias terminals 321 to 324 are used. In this case, it is preferable to alternatively arrange the input terminals 311 to 314 and the bias terminals 321 to 324. On the other hand, when connecting the PD array 20 and the TIA array by flip chip bonding, the input terminals 311 to 314 and the ground terminals 331 to 334 are used. In this case, it is preferable to alternatively arrange the input terminals 311 to 314 and the ground terminals 331 to 334.

However, as discussed above, three types of terminals for each TIA need to be provided on the TIA array 30. When these three types of terminals are arrayed in a line for each channel at a 250 μm pitch, the pitch between the terminals becomes 83.3 μm, which is too narrow and difficult for connection.

In the TIA IC according to the present embodiment, the input terminals 311 to 314 and the ground terminals 331 to 334 are arranged near and along the side S3 of the TIA array 30, and the bias terminals 321 to 324 are arranged inside of the TIA array 30 relative to the ground terminals 331 to 334 and the input terminals 311 to 314, respectively. Based on such arrangement, a pitch of 125 μm is ensured.

When connecting the TIA array 30 and the PD array 20 by wire bonding, wires for connecting the PD array 20 and TIA array 30 can cross a space between the PD array 20 and the TIA array 30. Therefore, the terminal that is positioned at the back of the TIA array 30 can easily be connected to the terminal of PD array 20. In contrast, when mounting the TIA array 30 by flip chip bonding, the ground terminals need to be arranged along and close to the side S3 facing the PD array 20, as it is preferable to arrange the ground terminals close to signal transmission line in terms of removing noises. Therefore, the bias terminals 321 to 324 are arranged inside of the TIA array 30 relative to the ground terminals 331 to 334.

A bias potential supply circuit ("supply circuit") 70 is provided and connected to the bias terminals 321 to 324 to supply bias potential from the bias terminals 321 to 324 to the cathode terminals 221 to 224. The supply circuit 70 is connected to interconnections between the bias terminals 321 to 324 and the capacitors C5 to C8 via resistors R1 to R4 to supply power with a power source Vcc.

Figure 4:
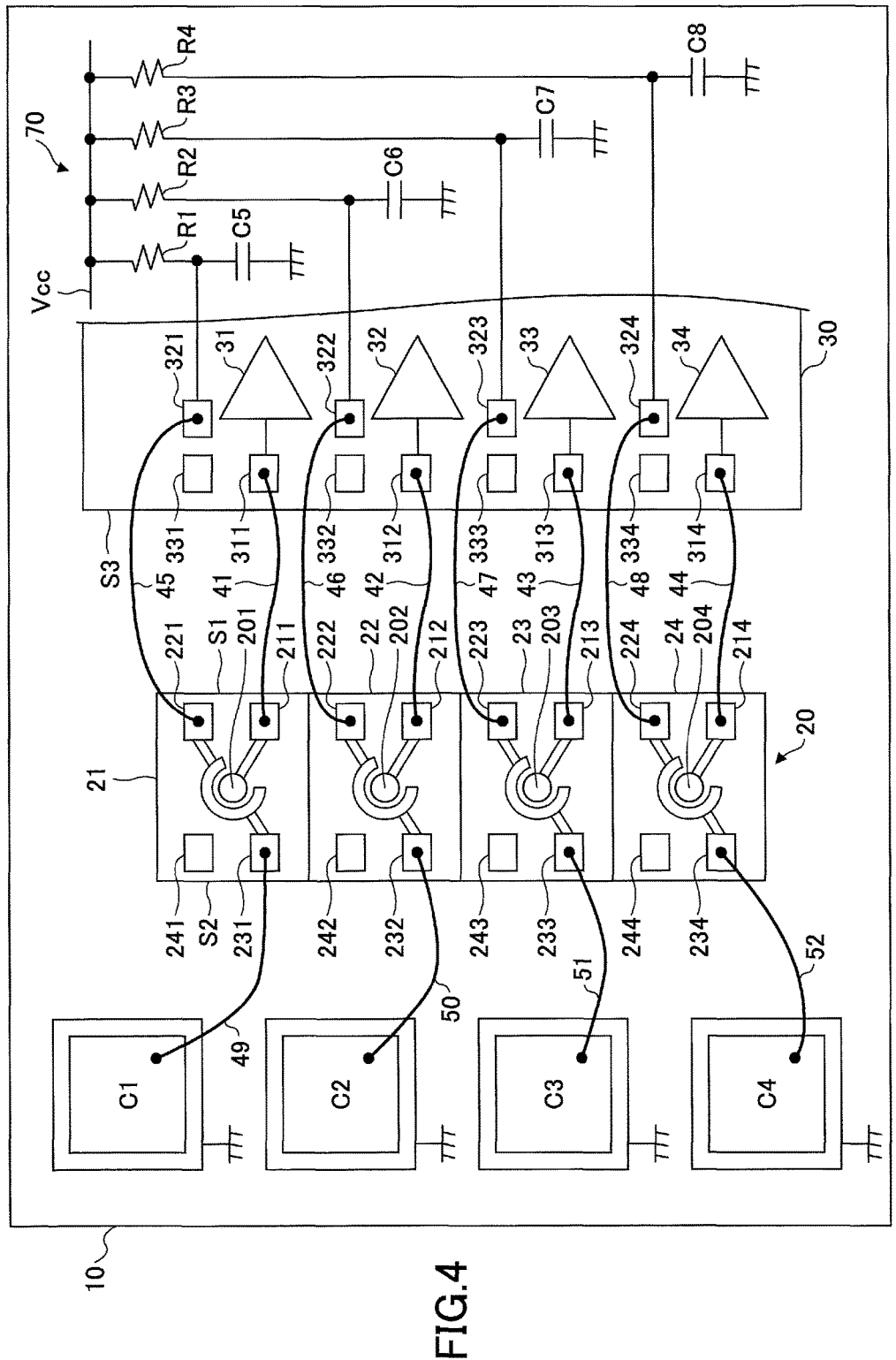
FIG. 4 is a diagram illustrating the IC mounting structure using wire bonding.

FIG. 4 is a diagram illustrating an IC mounting structure using wire bonding. As illustrated in FIG. 4, the anode terminals 211 to 214 and the input terminals 311 to 314 are connected to each other through wires 41 to 44. The cathode terminals 221 to 224 and the bias terminals 321 to 324 are connected to each other through wires 45 to 48. Although the bias terminals 321 to 324 are arranged at the back side of the TIA array 30 slightly distant from the side S3, the cathode terminals 221 to 224 and the bias supply terminals 321 to 324 can be readily connected to each other, because the wires 45 to 48 connecting the cathode terminals 221 to 224 with the bias terminals 321 to 324 cross over the space between the cathode terminals 221 to 224 and the bias terminals 321 to 324. Although the lengths of the wires 45 to 48 become slightly longer than the case where the bias terminals 321 to 324 are arranged in the vicinity of the side S3, the lengths do not significantly differ from the distance between the anode terminals 211 to 214 and the input terminals 311 to 314 and are only extended slightly longer than the distance in total, which hardly affect the characteristics.

The cathode terminals 231 to 234 are connected to the capacitors C1 to C4 through wires 49 to 52. As illustrated in FIG. 4, the capacitors C1 to C4 are preferably arranged on a side of the PD array 20 opposite to the TIA array 30 because the capacitors C1 to C4 need large areas for mounting on the substrate 10.

Figure 5:
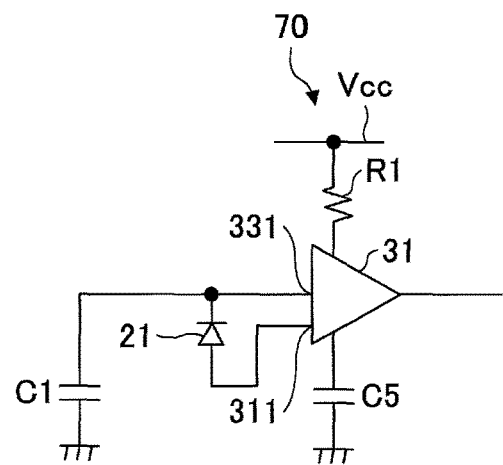
FIG. 5 is a circuit diagram illustrating a connection relationship between a PD and a TIA.

FIG. 5 is a circuit diagram illustrating a connection relationship between the PD 21 and the TIA 31. As illustrated in FIG. 5, the PD 21 receives the bias voltage from the TIA 31, and a current signal generated by photoelectric conversion is input to the TIA 31.

Figure 6:
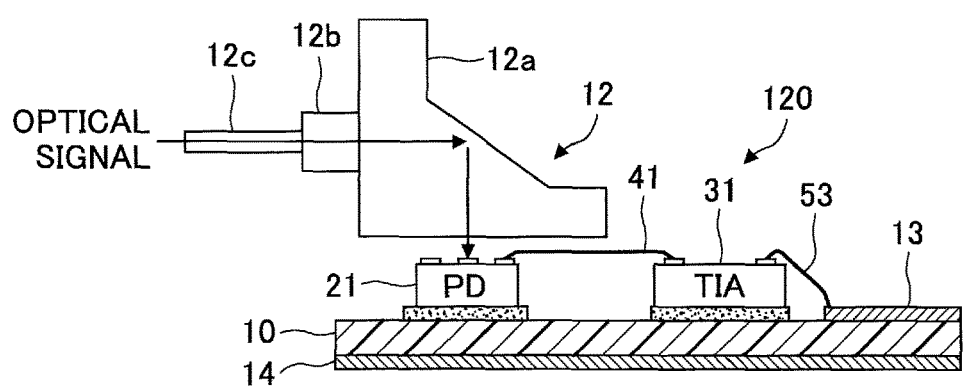
FIG. 6 is a diagram illustrating an optical receiving part according to the first embodiment.

FIG. 6 is a diagram illustrating the optical receiving part 120 according to the first embodiment. In FIG. 6, only the PD 21 and the TIA 31 are illustrated, but the other PDs 22 to 24 and the TIAs 32 to 34 have the same structure.

FPC may be used as the substrate 10. A wiring pattern 13 and a grounded electrode 14 are formed on a top surface and a back surface of the substrate 10, respectively.

The PD 21 and the TIA 31 are mounted on the substrate 10. The PD array 20 constitutes an optical receiving circuit. The TIA array 30 constitutes an amplifier circuit.

As illustrated in FIG. 6, the optical circuit 12 includes a 45-dgree mirror 12a. The optical circuit 12 can accommodate an optical fiber 12c using an optical connector 12b. The optical circuit 12 introduces a received optical signal to the PD 21. In other words, the optical signal input through the optical fiber 12c is introduced to the PD 21 by the mirror 12a. Although not illustrated in the drawings, the optical circuit 12 can accommodate plurality of optical fibers 12c. In this case, the optical signal input through each of the optical fibers 12c is introduced to each of the corresponding light receiving elements by the mirror 12a.

As discussed above, the PD 21 is electrically connected to the TIA 31 by wire bonding.

In other words, the anode terminal 211 of the PD 21 is electrically connected to the input terminal 311 of the TIA 31 through the wire 41. Further, the TIA 31 is electrically connected to the wiring pattern 13 through the wire 53.

The ground electrode 14 is formed on the back surface of the substrate 10, and the capacitors C1 and C5 are connected to the grounded electrode 14 via a through hole (not illustrated).

The other PDs 22 to 24 and the TIAs 32 to 34 are mounted on the substrate 10 in the same manner. The optical transceiver 100 is configured to have such an optical receiving part 120.

[Second Embodiment]

Figure 7:
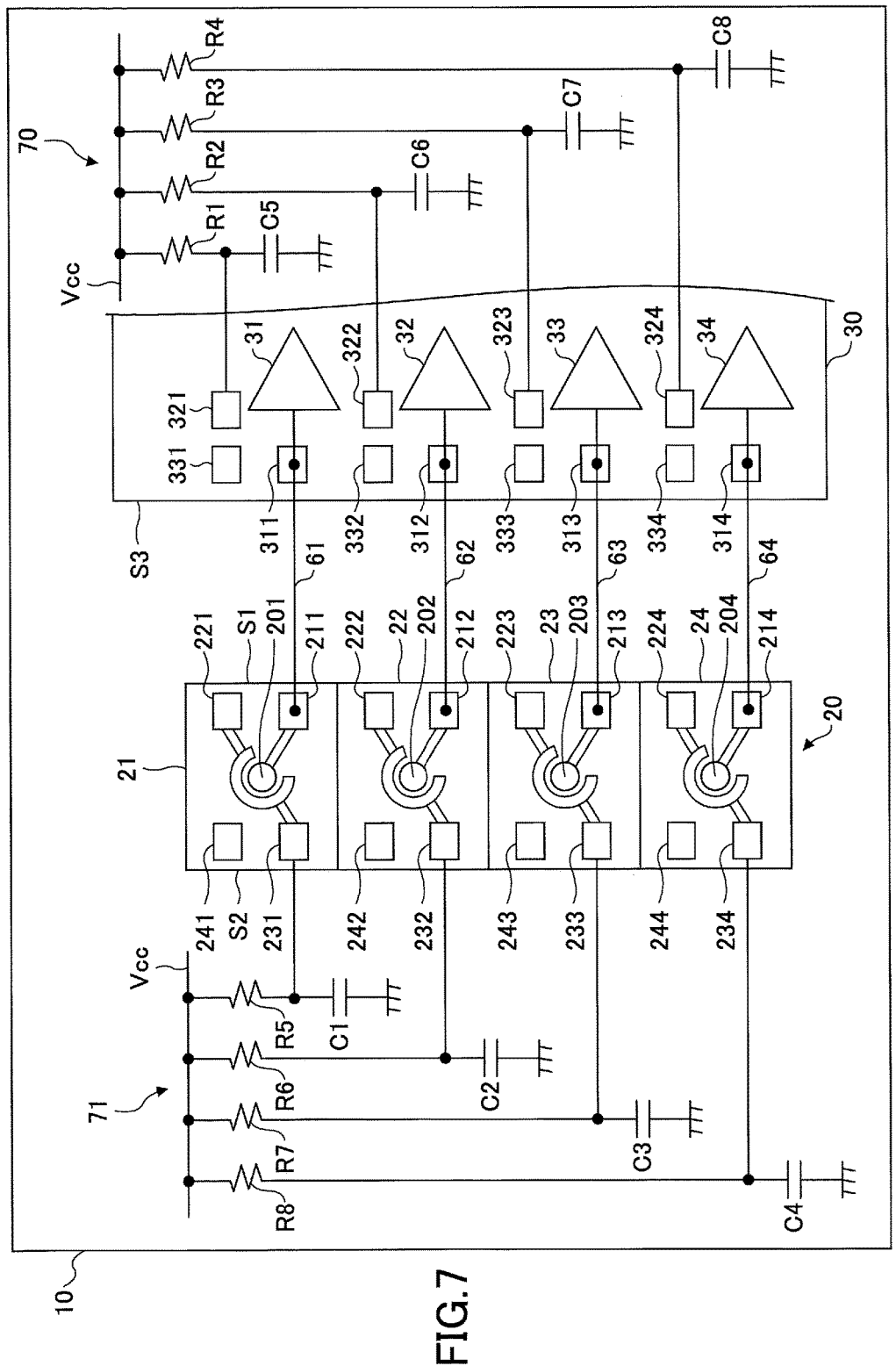
FIG. 7 is a diagram illustrating a TIA IC and an IC mounting structure according to a second embodiment.

FIG. 7 is a diagram illustrating a TIA IC and an IC mounting structure according to a second embodiment of the present invention. In the second embodiment, the anode terminals 211 to 214 of the PD array 20 are connected to the input terminals 311 to 314 by flip chip bonding.

In the TIA IC and the IC mounting structure according to the second embodiment, the bias potential is not supplied to the PDs 21 to 24 from the bias terminals 321 to 324, but supplied from the outside of the TIA array 30 to the cathode terminals 231 to 234. In FIG. 7, a supply circuit 71 is connected to the cathode terminals 231 to 234 of the PDs 21 to 24. The supply circuit 71 supplying the electrical power from power source Vcc is connected to electrode on the high voltage side of each of the capacitors C1 to C4 connected to the cathode terminals 231 to 234 through resistors R5 to R8. The bias potential is supplied form the supply circuit 71 to the cathode terminals 231 to 234.

The ground terminals 331 to 334 serve to absorb and remove noises of the transmission lines 61 to 64 and to stabilize the signal transmission. The transmission lines 61 to 64 are configured on the basis of the ground potential, which can more efficiently reduce cross talks between the transmission lines 61 to 64 adjacent to each other at a narrow pitch than the case where the transmission lines 61 to 64 are configured on the basis of the cathode potential.

Figure 8:
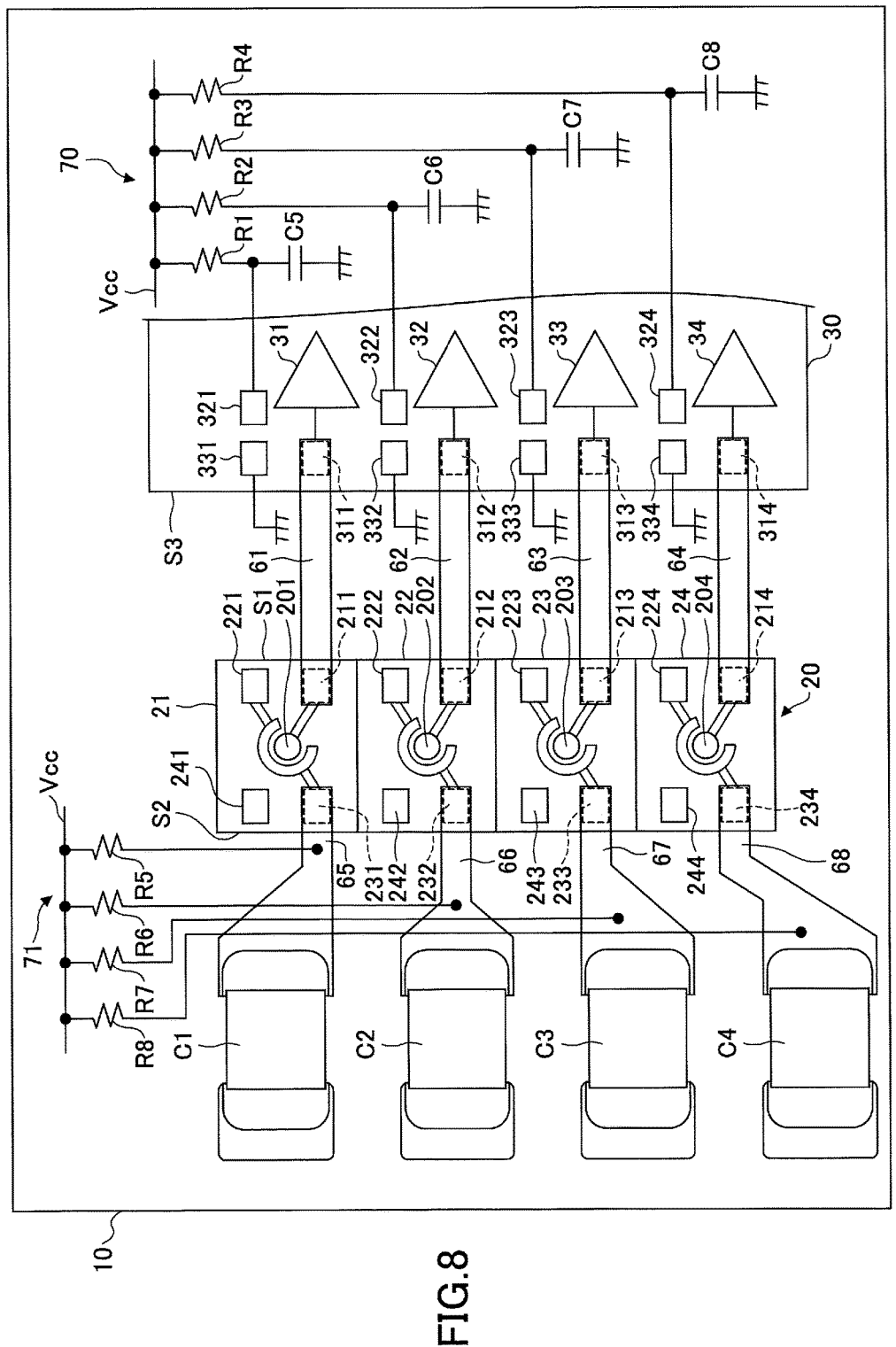
FIG. 8 is a diagram illustrating an IC mounting structure configured by flip chip bonding.

FIG. 8 is a diagram illustrating the IC mounting structure using flip chip mounting. In FIG. 8, elements including PD array 20 and TIA array 30 are mounted on the substrate 10 by flip chip bonding. As illustrated in FIG. 8, the anode terminals 211 to 214 are connected to the input terminals 311 to 314 via the transmission lines 61 to 64 that are formed on the substrate 10 as wiring patterns. The PD array 20 and the TIA array 30 are mounted on the substrate 10 in a face-down manner by flip chip mounting, and the anode terminals 211 to 214 are connected to the input terminals 311 to 314 via the transmission lines 61 to 64 formed on the substrate 10, respectively. The ground terminals 331 to 334 are arranged in the vicinity of the transmission lines 61 to 64, and reduce the cross talks between the transmission lines 61 to 64.

The supply circuit 71 is connected to wiring patterns 65 to 68 provided between the cathode terminals 231 to 234 arranged on the side S2 and the capacitors C1 to C4, respectively.

The supply circuit 71 illustrated in FIGS. 7 and 8 is only an example. A bias potential supply circuit may be configured variously depending on the intended use as long as the bias potential supply circuit can supply a predetermined bias potential. The supply circuit 71 may be connected to the wiring patterns 65 to 68 when the TIA array 30 and the PD array 20 are connected by flip chip bonding. When the TIA array 30 and the PD array 20 may not need to be connected to the wiring patters 65 to 68.

Figure 9:
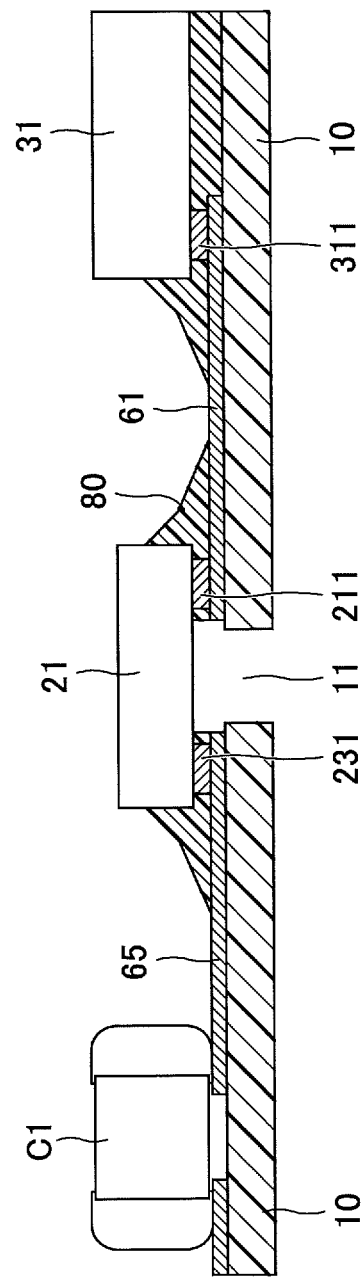
FIG. 9 is a cross-sectional view illustrating a connection configuration between the PD and the TIA.

FIG. 9 is a cross-sectional view illustrating an interconnection configuration between the PD 21 and the TIA 31. As illustrated in FIG. 9, the transmission line 61 and the wiring pattern 65 are formed on the substrate 10, and the PD 21 and the TIA 31 are bonded on the transmission line 61 and the wiring pattern 65 by the flip chip bonding. The anode terminal 211 of the PD 21 is connected to the input terminal 311 of the TIA 31, and the cathode terminal 231 of the PD 21 is connected to the capacitor C1. Bonding parts of the respective terminals 211, 231 and 311 on the transmission line 61 and the wiring pattern 65 are covered with underfill 80. In addition, an opening to receive light is formed in the substrate 10 at a position under the PD 21.

If the bias potential is supplied to the PDs 21 to 24 from the supply circuit 70 via the cathode terminals 221 to 224 close to the side S1, the connection distance between the PDs 21 to 24 and the TIAs 31 to 34 is likely to increase, because a certain space for using a mounting tool for chip mounting is needed, and interference in the underfill 80 has to be avoided. In this case, characteristic degradation of high-speed signal lines (the transmission lines 61 to 64) and instability of the bias potential may occur.

In the IC mounting structure according to the second embodiment, each of the PDs 21 to 24 and the TIAs 31 to 34 can be connected by only a single connection between the anode terminals 211 to 214 and the terminals 311 to 314. Moreover, because the ground terminals 331 to 334 are provided close to the transmission lines 61 to 64, and cathode potential is applied to PDs 21 to 24 from an external separate circuit, respectively, the characteristics of the high-speed signal lines can be improved, and the bias voltage can be stabilized.

Figure 10:
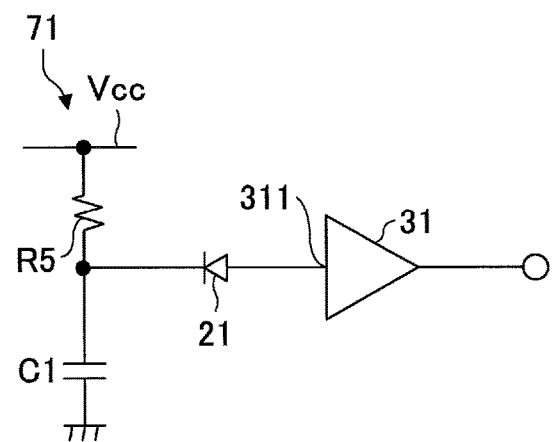
FIG. 10 is a diagram illustrating a PD and a TIA according to a second embodiment.

FIG. 10 is a diagram illustrating a circuit diagram of the PD 21 and the TIA 31 according to the second embodiment. As illustrated in FIG. 10, the supply circuit 71 supplies the bias voltage to the PD 21 through the resistor R5, and a current signal is input to the TIA 31 from the anode of the PD 21.

Figure 11:
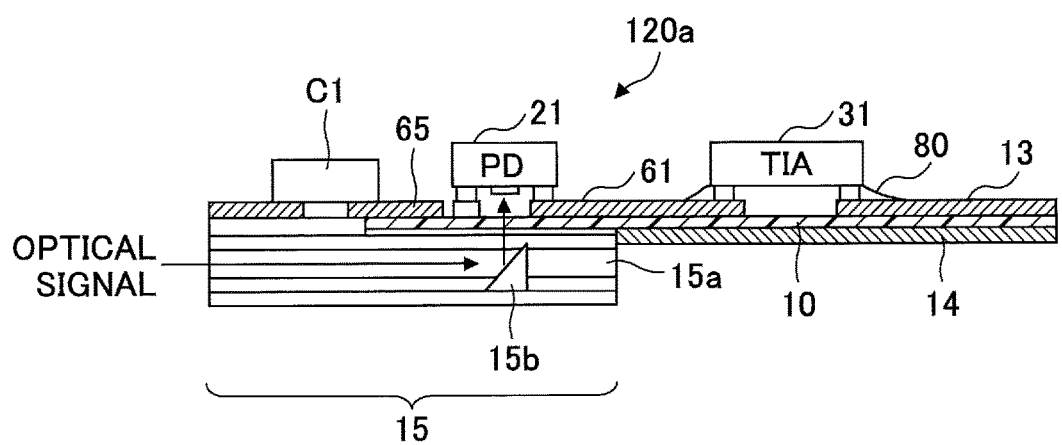
FIG. 11 is a diagram illustrating an optical receiving part according to the second embodiment.

FIG. 11 is a diagram illustrating the optical receiving part 120a according to the second embodiment. In FIG. 11, only the PD 21 and the TIA 31 is described as an example, but the other PDs 22 to 24 and the TIA 32 to 34 have the same configuration.

As illustrated in FIG. 11, the optical receiving part 120a includes the substrate 10, the PD 21, the TIA 31 and an optical circuit 15. The substrate 10 is, for example, made of an FPC. Furthermore, the wiring patterns 13 and 65 and the transmission line 61 are formed on the top surface of the substrate 10. A grounded electrode 14 is formed on the back surface of the substrate 10.

As described above, the PD 21 and the TIA 31 are mounted on the substrate by flip chip bonding. The PD 21 and the TIA 31 are electrically connected to the wiring pattern or the electrode of the substrate 10 by the flip chip mounting.

As discussed above, the PD 21 and/or the TIA 31 are fixed to the substrate 10 by the underfill 80.

The optical circuit 15 includes an optical waveguide 15a and a mirror 15b. The optical circuit 15 can accommodate an optical fiber (not illustrated). An optical signal input through the optical fiber is guided to the PD 21 via the optical wave guide 15a and the mirror 15b. The optical circuit 15 can accommodate a plurality of optical fibers. In this case, the optical signal input via each optical fiber is introduced to the corresponding PDs 21 to 24, respectively.

The optical receiving part 120a can be configured by providing an optical waveguide provided on the back surface of the substrate 10.

The PDs 21 to 24 are electrically connected to the corresponding TIAs 31 to 34 through the wiring patterns 61 to 64 formed on the substrate 10, respectively.

Moreover, the capacitor C1 is connected to the PD 21 through the wiring pattern 65. The bias potential supply circuit (not illustrated) is connected to the wiring pattern 65, and supplies the bias potential to the PD 21.

The optical transceiver 100 can be configured to include such an optical receiving part. Because the TIA IC and the IC mounting structure according to the second embodiment differ from the TIA IC and the IC mounting structure according to the first embodiment only in mounting structure, and the other configuration is similar to the configuration of the first embodiment, the description is omitted.

The TIA IC, the IC mounting structure and the optical transceiver according to the present embodiments can achieve preferable signal characteristics and stability of bias potential even when flip chip mounting is adopted. Moreover, even when wire bonding is adopted, the preferable signal characteristics and the stability of bias potential can be also achieved.

As discussed above, the embodiments of the present invention can achieve preferable characteristics in the flip chip mounting while responding to the wire mounting.

Although embodiments of the present invention has been specifically illustrated and described, it is to be understood that the present invention is not limited to the specifically disclosed embodiments, and minor modifications may be made therein without departing from the spirit and scope of the invention as defined by the claims.

What is claimed is:

1. A transimpedance amplifier connectable to a light receiving element, the transimpedance amplifier comprising:

a bias terminal for suppling bias potential to the light receiving element;

an input terminal to receive a signal from the light receiving element; and a ground terminal, wherein the input terminal and one of the bias terminal and the ground terminal are arranged along and parallel to the one side of the transparent amplifier, and the other of the supply terminal and the ground terminal is arranged inside of the transimpedance amplifier relative to the input terminal.

2. The transimpedance amplifier as claimed in claim 1, wherein the input terminal and the ground terminal are arranged along and parallel to the one side of the transimpedance amplifier, and the supply terminal is arranged inside of the transimpedance amplifier relative to the input terminal and the ground terminal.

3. A circuit mounting structure, comprising:

a substrate;

a transimpedance array mounted on the substrate, and including a plurality of transimpedance amplifiers corresponding to one of a plurality of channels, respectively; and a photodiode array mounted on the substrate, and including a plurality of photodiodes corresponding to the plurality of channels, respectively, the transimpedance array includes, bias terminals each of which corresponds to one of the channels, respectively, and supplies bias potential to the corresponding photodiode;

input terminals each of which corresponds to one of the channels, respectively, and receives a signal from corresponding photodiode, respectively; and ground terminals each of which corresponds to one of the channels, respectively, and the input terminals and the ground terminals being arranged on a side of the transimpedance array facing the photodiode array, and the bias terminals are arranged inside of the transimpedance amplifier relative to the input terminal.

4. The circuit mounting structure as claimed in claim 3, further comprising:

first wires each of which connects one of the input terminals with an anode of the corresponding photodiode; and second wires each of which connects one of the bias terminals with a cathode of the corresponding photodiode.

5. The circuit mounting structure as claimed in claim 3, further comprising:

grounded capacitors provided on a side of the substrate opposite to the side where the transimpedance array is mounted with respect to the photodiode array, and each of the grounded capacitors is connected to a cathode of the corresponding photodiode.

6. The circuit mounting structure as claimed in claim 3, wherein an anode interconnection connecting the anode of the photodiode with the signal input terminal is input to the chip by a transmission line configured based on a grounded potential in each of the plurality of channels.

7. An optical transceiver, comprising:

an optical communication module; and an optical waveguide optically connected with the optical communication module, wherein the optical communication module comprising:

a substrate;

a transimpedance amplifier mounted on the substrate; and a photodiode mounted on the substrate, the transimpedance amplifier includes, a bias terminal supplies bias potential to the photodiode;

an input terminal receives a signal from the photodiode; and a ground terminal, wherein the input terminal and the ground terminal being arranged along and parallel to side of the transimpedance amplifier facing the photodiode, and the bias terminal is arranged inside of the transimpedance amplifier relative to the input terminal.

* * * * *